United States Patent [19]

Richardson

[11] Patent Number: 4,759,572
[45] Date of Patent: Jul. 26, 1988

[54] TUBE CONNECTOR

[75] Inventor: William D. Richardson, Palos Park, Ill.

[73] Assignee: Tuthill Corporation, Chicago, Ill.

[21] Appl. No.: 40,027

[22] Filed: Apr. 20, 1987

[51] Int. Cl.⁴ .............................................. F16L 17/02
[52] U.S. Cl. .................................... 285/101; 285/308; 285/312; 285/346
[58] Field of Search ............... 285/100, 101, 108, 308, 285/312, 346, 348, 358

[56] References Cited

U.S. PATENT DOCUMENTS

| | | | |
|---|---|---|---|
| 1,341,536 | 5/1920 | Borcherdt | 285/312 |
| 2,544,764 | 3/1951 | Parkes | 285/346 X |
| 2,712,458 | 7/1955 | Lipson | 285/101 |
| 2,819,733 | 1/1958 | Maisch | 285/317 |
| 3,425,717 | 2/1969 | Bruce | 285/312 X |
| 3,542,076 | 11/1970 | Richardson | 285/338 X |
| 3,727,952 | 4/1973 | Richardson | 285/316 X |
| 3,738,688 | 6/1973 | Racine | 285/312 |
| 3,779,587 | 12/1973 | Racine | 285/312 |
| 3,799,207 | 3/1974 | Richardson et al. | 138/89 |
| 3,868,132 | 2/1975 | Racine | 285/312 |
| 4,326,407 | 4/1982 | Van Meter et al. | 285/346 X |
| 4,345,783 | 8/1982 | Bergstrand | 285/101 X |
| 4,540,201 | 9/1985 | Richardson | 285/101 |

FOREIGN PATENT DOCUMENTS 449092  4/1950  Italy ................................... 285/346

Primary Examiner—Randolph A. Reese
Assistant Examiner—Anthony Knight
Attorney, Agent, or Firm—Mann, McWilliams, Zummer & Sweeney

[57] ABSTRACT

A tube connector used to connect conduits for fluid pressure to pressure testing equipment, the tube connector including a piston slidably disposed within a housing, the piston defining a chamber for containment of a seal which engages the outer periphery of the tube to be tested.

4 Claims, 1 Drawing Sheet

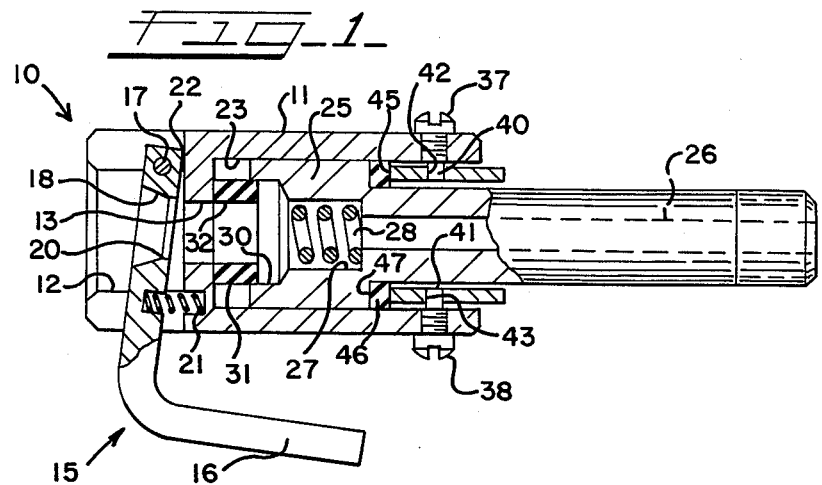
FIG_1_
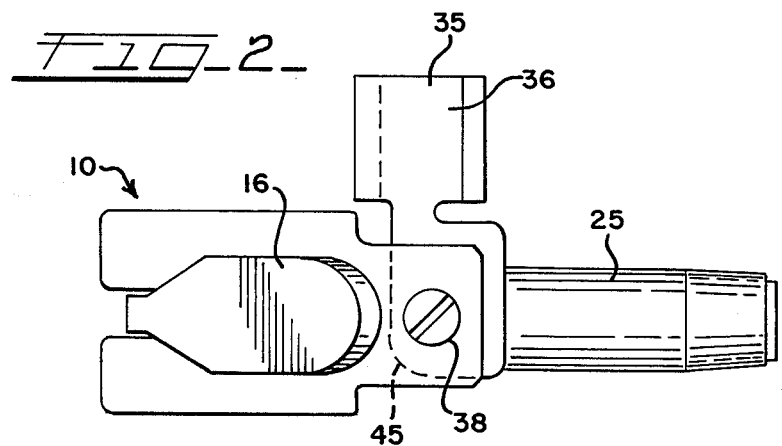
FIG_2_
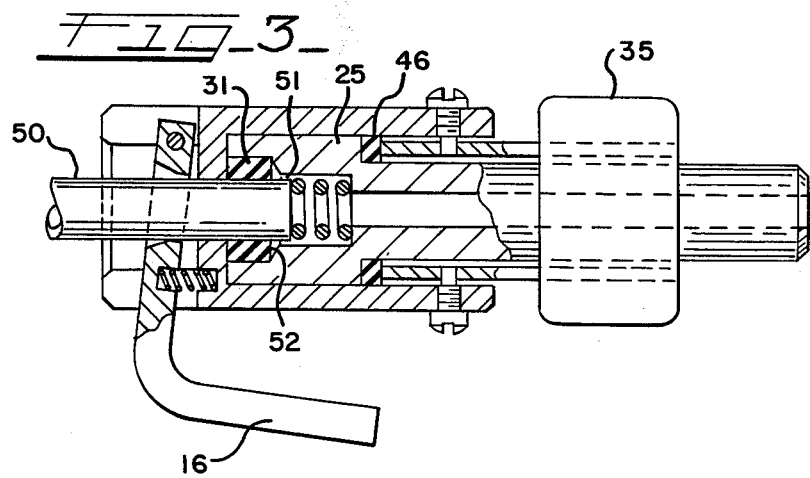
FIG_3_

TUBE CONNECTOR

BACKGROUND OF THE INVENTION

The present invention pertains to a device generally referred to in the art as a tube connector. This device is utilized to connect thin wall conduit, tubes, or the like, such as found in refrigeration apparatus, to high-pressure test equipment for testing of the apparatus before it is put into service. In the pretesting of such equipment on an assembly-line basis or where equipment is already installed, it is necessary to be able to connect the equipment to the testing apparatus quickly and easily. Numerous devices of this general type exist in the prior art, as set forth in the following U.S. Pat. Nos.: 2,819,733, 3,542,076, 3,727,952, 3,738,688, 3,779,587, 3,799,207, 3,868,132, 4,326,407, and 4,540,201.

One problem, however, which has existed in devices of the type illustrated in Racine Patent 3,868,132 is that when the tube is inserted and the handle is rotated to the locked position and the tube is then pressurized, the pressure acting against the side face of the seal urges it away from the face of the piston thereby promulgating a leak path for pressure to escape along the seal face and then between the piston and housing. No prior art device has effectively resolved this problem.

SUMMARY OF THE INVENTION

The present invention provides a tube connector which defines a chamber in one end of a cam-operated piston, which chamber is adapted to receive and confine a seal therein during the operative pressure testing of the equipment. This arrangement increases sealing effectiveness upon pressurization of the tube and decreases pressure loss.

BRIEF DESCRIPTION OF THE DRAWINGS

FIG. 1 is a side view, partially in section, of the tube connector of the present invention in a nonoperative position.

FIG. 2 is a top view of the device illustrated in FIG. 1, also in the non-operative position.

FIG. 3 is a side view, partially in section, of the tube connector of the present invention in an operative position.

DESCRIPTION OF THE PREFERRED EMBODIMENT

FIGS. 1 and 2 illustrate the tube connector of the present invention, generally referred to as 10, in a non-operative or at-rest position. The tube connector includes a hollow body 11 with an enlarged entrance aperture 12 defined at one end. A narrower entrance aperture 13 is defined in the hollow body 11 concentric with the aperture 12. An automatic tube-locking mechanism 15 is provided intermediate the apertures 12 and 13 to securely grip and hold a tube in place. The tube locking device or gripping mechanism includes a lever 16 secured to the housing 11 by pivot pin 17. A tapered aperture 18 is defined through a portion of the handle 16 intermediate the apertures 12 and 13. The tapered aperture 18 includes a knife edge 20, best shown in FIG. 1. A spring 21 is shown disposed between the handle 16 and the housing 11 in a manner so as to urge the lever to pivot about the pivot pin 17 in a clockwise direction until a corner 22 of the lever 16 engages the front face of the housing 11, thereby limiting any further travel of the lever 16. When the lever 16 is in the at-rest position, as shown in FIG. 1, the central axis of the aperture 18 is not aligned with the central axis of aperture 13, but rather is disposed at an angle thereto.

The housing 11 defines a cylinder 23 internal thereto. Slidably disposed within the cylinder 23 is a piston 25, which defines a passage 26 through its interior. The piston 25 further defines a recess 27 within which is disposed a resilient biasing member, here illustrated as a spring 28. The spring 28 is retained in a compressed condition within the confines of the recess 27 by any of a number of commonly accepted methods including providing a lip (not shown) at the outer edge of the recess. The chamber 27 is sized so as to receive a tube to be tested. The piston 25 defines a chamber 30 at one end which is particularly adapted to receive and confine a compressible seal 31 formed of resilient elastomeric material. The seal 31 is sized so as to permit the insertion of a tube through its central aperture 32.

A cam locking lever 35, best illustrated in FIG. 2, is used to lock a tube in place when testing is desired. The cam lever includes a handle 36 of generally U-shaped, hollow configuration so as to overlie the end of the piston 25 when in the closed position, as illustrated in FIG. 3. The cam lever 35 is pivotally secured to the housing 11 by means of screws 37 and 38 which terminate in pivot pins 40 and 41, which are inserted through apertures 42 and 43 formed in the cam lever. The lever 35 further includes a rounded cam surface 45, best shown in FIG. 2, the purpose for which will readily become apparent. Disposed adjacent the cam surface 45 is a metallic washer 46. As shown in FIG. 1, the washer 46 lies between the surface 45 and a shoulder 47 formed on a rear face of the piston 25.

The operation of the invention of the present device is as follows. When the device is in the nonoperable position, as shown in FIGS. 1 and 2, the locking lever 16 is biased toward its clockwise position with the edge 22 of the lever engaging the housing. The aperture 18 is out of alignment with the entrance aperture 13. The cam lever 35 is raised and the piston 25 is disposed toward the right, as shown in FIG. 1. A substantial gap exists between the left end of the piston 25 and the inner face of the housing 11. The seal 31 is substantially uncompressed and resides partly within the chamber 30.

When testing is desired, a tube 50 which is connected to the device to be tested is inserted through apertures 12, 18, 13, and 32 into the recess 27 defined within the piston. In order to accomplish this, the gripping mechanism 15 is actuated so as to align apertures 18 and 13 concentrically. This is easily done by gripping the end of lever 16 and pressing toward the housing 11, thereby rotating the handle 16 about the pivot point 17 in a counterclockwise direction. When the apertures 18 and 13 are aligned, tube 50, as illustrated in FIG. 3, is inserted through apertures 18 and 13, through the inner periphery 32 of the seal 31 until the tube engages spring 28 and lies partially within the recess 27. The lever 16 is then released, and the spring 21 causes the lever to pivot about point 17, clockwise, until the knife edge 20 engages the tube 50. The gripping mechanism 15 thus secures the tube in place. A fluid path 51 is defined between the outer wall of the tube 50 and the inner wall of the recess 27 of sufficient dimension so as to allow fluid pressure to be communicated from the tube 50 through path 51 and to act against end face 52 of seal 31.

When the cam lever 35 is rotated clockwise from the position shown in FIG. 2 to the position shown in FIG.

3, the cam surface 45 acts upon the metal washer 46 forcing the piston 25 to the left from the position shown in FIG. 1 to assume the position shown in FIG. 3. The gap between the end face of the piston 25 and the front face of the housing 11 is substantially diminished. The seal 31 is now substantially confined between the chamber 30, on its outer periphery, and the outer diameter of the tube 50, on its inner periphery.

When it is desired to conduct the pressure test, a source of fluid pressure, not illustrated, is connected to the end of the piston 25 so as to allow pressure to be communicated through passage 26 to conduit 50. When the charging fluid is introduced, fluid pressure passes through the fluid path 51 and acts against the side face 52 of the seal 31 exerting a force against the seal tending to further compress same. By virtue of the confinement of the seal within chamber 30, the effect of the pressure acting against the seal face is to further compress the seal and to force a tighter engagement of the interior surface 32 of the seal 31 with the outer periphery of the tube 50, thereby increasing the sealing effectiveness of the tube connector. Such action increases the efficiency of the sealing action and minimizes the possibility of pressure escaping around the seal 31, thereby resulting in a tube connector which provides greatly enhanced results over prior art devices.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A tube connector including a hollow body defining an entrance aperture at one end thereof for insertion of a tube to be tested, a cylinder defined internal to said body, a piston slidably disposed within said cylinder, gripping means associated with said body disposed adjacent said entrance aperture operable to allow insertion of said tube into said body and to secure said tube in place after insertion, a chamber defined in one end of said piston, said chamber including an outer wall defined by an internal wall of said piston, said chamber adapted to receive and confine a seal therein, a compressible, annular seal disposed in said chamber combined between said outer wall of said chamber and said body, said seal adapted to surround the outer periphery of said tube to be tested, said chamber having a depth slightly less than the corresponding width of said seal in its uncompressed condition, a cam lever associated with said piston positionable in an open position and movable to a closed position wherein said piston is moved relative to said hollow body compressing said seal in said chamber between said outer wall of said chamber, said tube and said body thereof causing said seal to engage and seal against the outer periphery of said tube to be tested, and a fluid path defined between said tube and said chamber whereby, upon pressurization of said tube connector, said pressure is communicated along said fluid path to said chamber and is effective to act against said seal which is confined by said chamber causing further compression of said seal resulting in an increase in sealing effectiveness.

2. A tube connector as in claim 1 including a fluid passage through said piston.

3. A tube connector as in claim 1 including a recess defined internal to said piston and a resilient biasing member disposed in said recess.

4. A tube connector as in claim 1 in which said cam lever includes a handle of U-shaped configuration adapted to overlie a portion of said piston when said cam lever is in its closed position.

* * * * *